United States Patent [19]
Cox

[11] Patent Number: 5,908,269
[45] Date of Patent: Jun. 1, 1999

[54] HELICAL CUTTER GEOMETRY FOR A CUTTING TOOL USED TO MANUFACTURE TURBINE ROTORS

[75] Inventor: Jimmy Arthur Cox, Clemmons, N.C.

[73] Assignee: Siemens Westinghouse Power Corporation, Orlando, Fla.

[21] Appl. No.: 08/905,708

[22] Filed: Aug. 5, 1997

[51] Int. Cl.[6] .............................. B23B 27/06; B23C 5/12
[52] U.S. Cl. ............................................. 407/59
[58] Field of Search ................... 407/59, 58, 31, 407/51, 54, 56, 57, 63

[56] References Cited

U.S. PATENT DOCUMENTS

| Re. 26,544 | 3/1969 | Castor, Sr. | 407/59 X |
|---|---|---|---|
| 294,192 | 2/1884 | Broadbent | 407/58 X |
| 3,133,339 | 5/1964 | Ribich | 407/54 |
| 4,083,643 | 4/1978 | Parone | 407/59 |
| 5,083,887 | 1/1992 | Dotany | 407/59 |

OTHER PUBLICATIONS

Illustrations of Turbine Rotor Cutting Tool manufactured by Precision Tool Works of Philadelphia, PA, (old design side view and old design looking from end).

*Primary Examiner*—Andrea L. Pitts
*Assistant Examiner*—Henry W. H. Tsai

[57] ABSTRACT

A cutting tool for machining a work piece to form a turbine rotor having a longitudinal axis includes a plurality of curved splines extending from a back of the tool to a front of the tool. Each spline is curved so that it is not parallel to a plane perpendicular to the longitudinal axis of the tool. Preferably, each spline is curved in a helical shape in the axial direction. Disposed along each spline are a plurality of cutting teeth. Each tooth has a cutting face that is helical in shape. Due to this helical shape of the cutting face of each tooth, a positive radial rake angle is formed for each tooth and a positive axial rake angle is formed for each tooth. These positive rake angles enhance the characteristics of the cutting process. The top of each tooth is also curved to form radial relief for each tooth. Furthermore, each tooth disposed axially forward of another tooth along a spline has a radial height that is less than the other tooth to provide cutting relief in the axial direction for each tooth.

13 Claims, 4 Drawing Sheets

HELICAL CUTTER GEOMETRY FOR A CUTTING TOOL USED TO MANUFACTURE TURBINE ROTORS

BACKGROUND OF THE INVENTION

This invention relates to milling machines and cutting tools usable in milling machines. In particular, the cutting tool of this invention has a helical shaped cutting surface for machining the inside diameter of a turbine rotor.

This invention is related to the subject matter of commonly assigned copending U.S. patent application Ser. No. 08/904,155 (attorney docket number T196012) filed on Jul. 31, 1997, now U.S. Pat. No. 5,844,191, entitled "Method of and System For Manufacturing A Helical Cutter," which is hereby incorporated by reference.

Milling or boring machines may employ a variety of cutting tools. A cutting tool may be of the type that has a longitudinal axis with teeth disposed around the circumference of the longitudinal axis. These cutting tools can be inserted into a hole and rotated about their longitudinal axis to bore a larger hole to a specified shape, such as a larger diameter. Tools of this type are well known and may be employed in manufacturing tubular shaped structures, such as a turbine rotor.

A cutting tool may be classified as either a standard cutting tool or a form cutting tool. A standard cutting tool is prefabricated to certain dimensions and can typically be purchased by specifying a stock number or the like. In contrast, form cutters are those that are designed to cut a work piece to a specific shape. Form cutters are typically manufactured to specific dimensions as specified by the purchaser. As those of skill in the art will appreciate, tools used in the manufacturing of turbine rotors are typically form cutters.

During cutting operations chips are created. These chips vary in size and shape depending on the type of material being cut, the material doing the cutting and in large part on the geometry of the cutting tool. The size and shape of the chips, and consequently the geometry of the cutting tool is important because it affects the speed of cutting, tool wear, surface finish, safety of a cutting operation, machining tolerances and other characteristics of the cutting process. For instance, continuous chips generally produce a good surface finish but may present a safety concern for the tool operator. In comparison, segmented chips may cause a severe distortion of the metal in the area adjacent to the tool and cracking of the work piece. One way to control the type of chip generated is to select the proper geometry of a cutting tool. Thus, the geometry of a cutting tool is a critical feature in controlling the cutting process.

The tool geometry may also affect the force or torque required to cut a work piece. Typically, the tool face of a cutting tool, the surface against which the chips bear, is inclined to either increase or decrease the keenness or bluntness of the cutting edge. Conventionally, the inclination of the cutting face is referred to as the rake angle. Since the tool face may be inclined in more than one direction, a cutting surface may have more than one rake angle. Rake angles can be either positive or negative. A rake angle is positive if the cutting edge leads the surface of the tooth face with respect to a work piece and negative if it lags behind the tooth face. Positive rake angles tend to reduce the requisite cutting force or torque and direct chip flow away from the work piece. In contrast, negative rake angles generally increase the required cutting force, but provide greater strength at the cutting edge.

Conventionally, cutting tools used to manufacture turbine rotors have a plurality of teeth disposed axially and circumferentially along the cutting tool. Each tooth is disposed along a spline extending axially from the front of the tool to the back of the tool. Each spline extends parallel to the longitudinal axis of the tool. The cutting face of each tooth along the spline is substantially parallel to the cutting face of the other teeth disposed along that spline. Additionally, the teeth are disposed at a rake angle of zero in both the axial and radial directions. The tolerance of cuts made with a tool of this geometry is limited. Furthermore, the efficiency of the cutting process and the cutting speed are also limited with this type of tool. Moreover, the force or torque required to cut with a tool of this geometry is relatively substantial.

Because of the limitations of conventional cutting tools, an improved cutting tool used to manufacture turbine rotors is needed. Conventional methods and systems of manufacturing cutting tools have prevented the development of such an improved cutting tool. In particular, cutting tools of this type were conventionally manufactured with a milling machine or similar cutting machine. Because of the limitations inherent in milling processes, the geometry of cutting tools manufactured with a milling process is limited.

SUMMARY OF THE INVENTION

A cutting tool of this invention has a longitudinal axis extending from a back of the tool to the front of the tool. Disposed axially on the cutting tool are a plurality of splines that are curved with respect to the longitudinal axis. A plurality of teeth are disposed on each spline. Preferably, the teeth extend outward from the spline and have a curved cutting face. The cutting face may be curved in both the radial direction and the axial direction. By curving the cutting face a positive rake angle is formed in both the axial and the radial directions. This results in enhanced performance characteristics of the cutting tool relative to an axial tool having rake angles of zero or negative rake angles. Among the characteristics enhanced are machining tolerances, cutting efficiency and the amount of force or torque required.

The spline may have a curved cutting surface that forms the cutting face of each tooth. Preferably, this curved cutting surface is curved in a helical shape in the axial direction of the cutting tool. Due to the helical shape, the positive radial and axial rake angles are formed. Furthermore, because of the helical shape, the radial rake angle increases for any point on any tooth disposed radially outward from any other point on the tooth. Additionally, the axial rake angle is greater for any point on any tooth disposed axially behind another point.

In a preferred embodiment of the invention any tooth disposed along the spline has a height that is greater than any tooth disposed forward of it. This provides axial relief for the tooth forward of any other tooth. Furthermore, each tooth preferably has a top that is curved to provide relief for the tooth in the radial direction.

The cutting tool of this invention may be employed in a variety of milling machines. In a preferred embodiment, it is used in a horizontal boring machining.

DETAILED DESCRIPTION OF THE PREFERRED EMBODIMENTS

Figure 1:
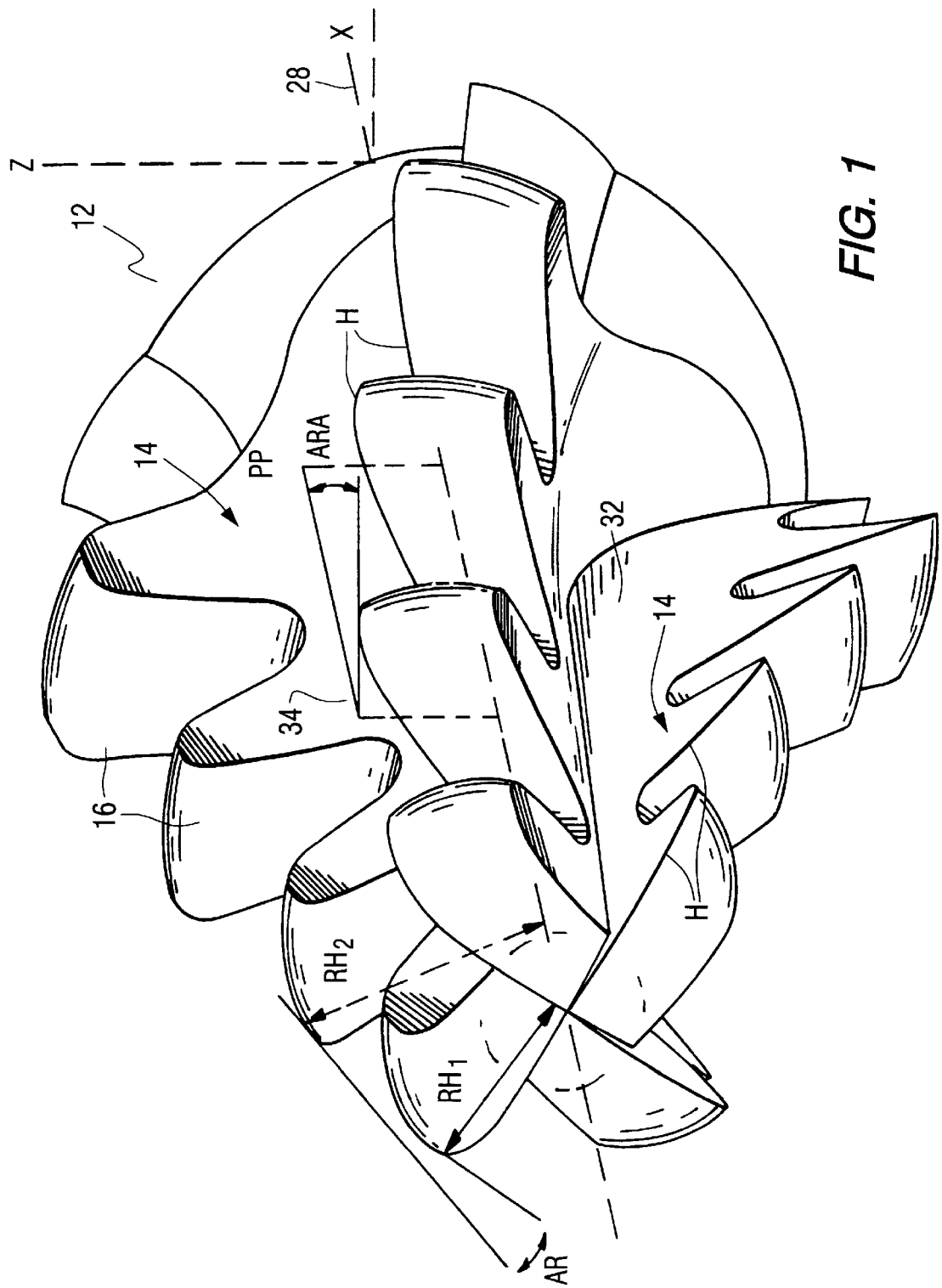
FIG. 1 is an isometric view of a cutting tool according to a preferred embodiment of the invention.
Figure 2:
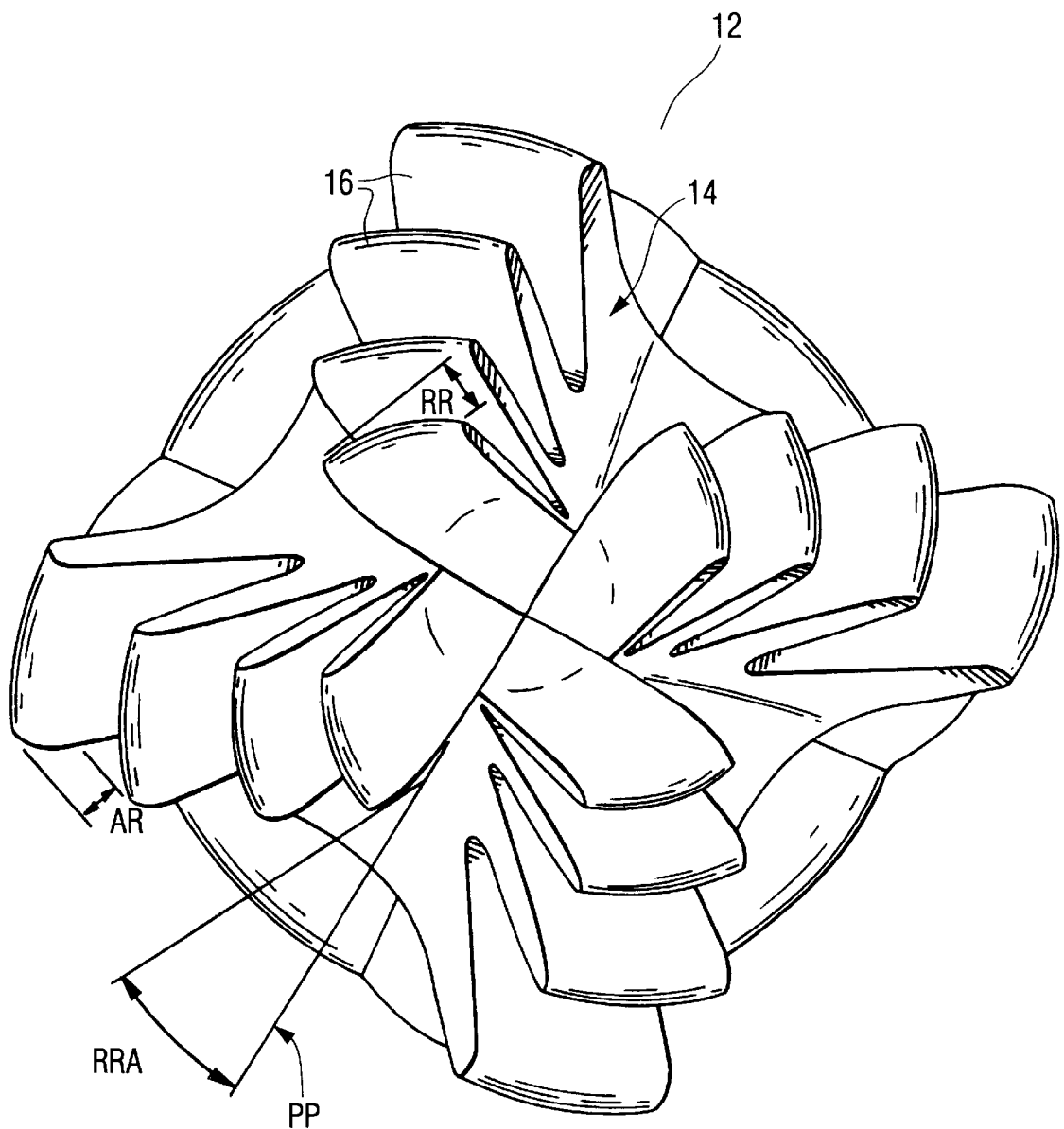
FIG. 2 is an end view of the preferred embodiment of the cutting tool depicted in FIG. 1.
Figure 3:
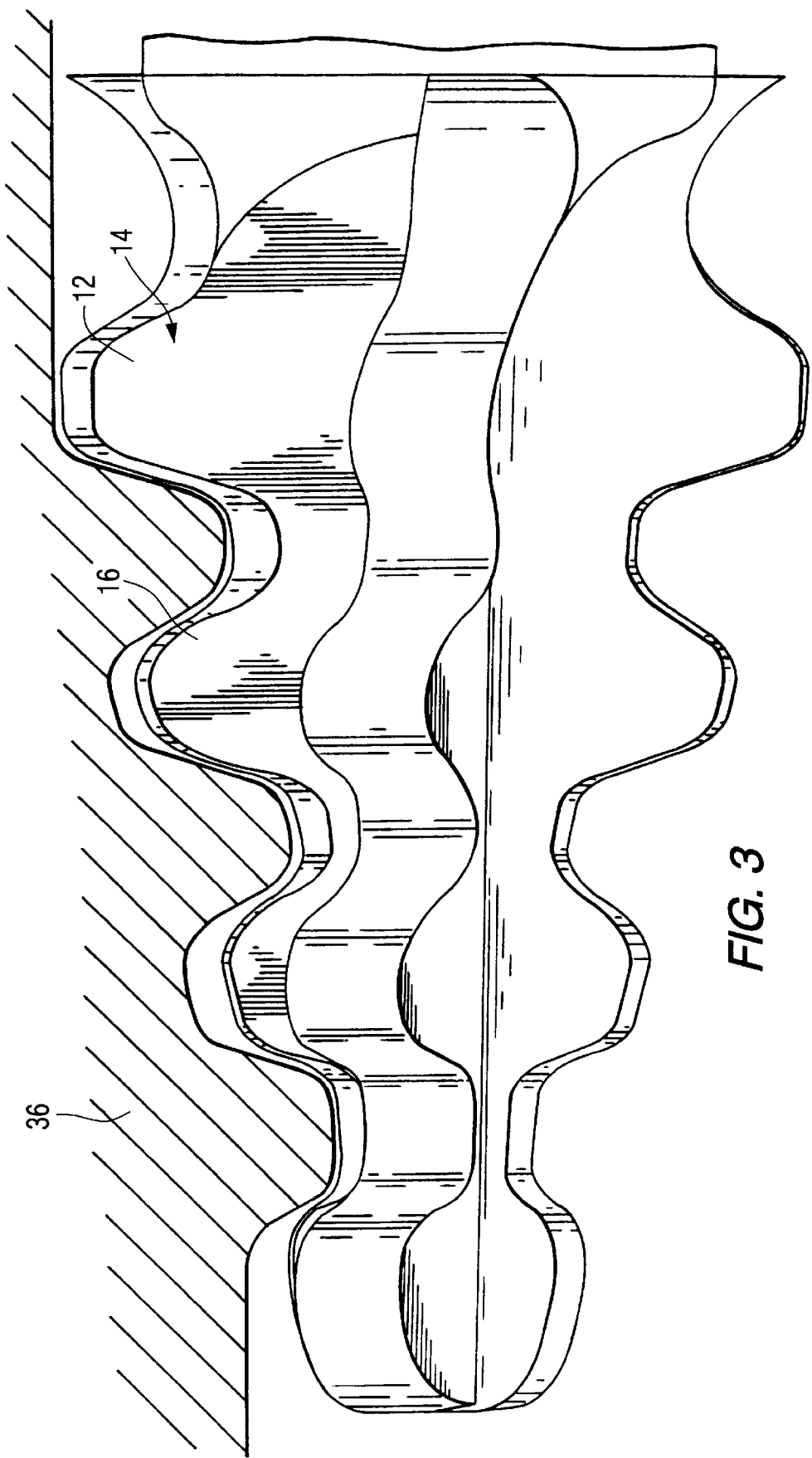
FIG. 3 is a diagrammatical view of a work piece being machined with the cutting tool of FIG. 1.
Figure 4:
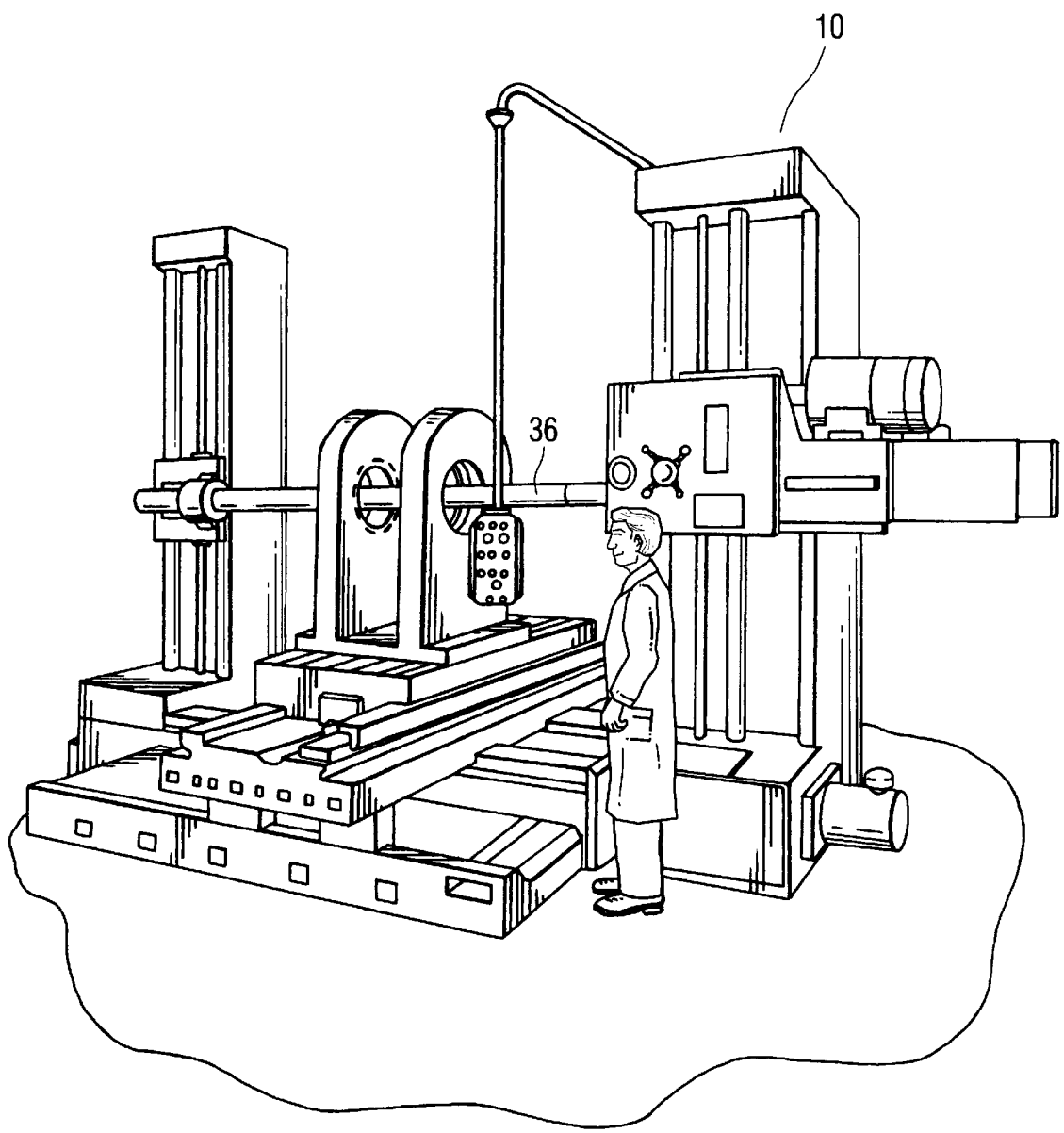
FIG. 4 is a milling machine that may employ the cutting tool of FIG. 1.

Depicted in FIG. 4 is an isometric view of a cutting machine 10 that can use the cutting tool 12 of this invention shown in FIGS. 1–3. Although in a preferred embodiment of this invention, the cutting machine 10 is a horizontal boring machine 10, it will be appreciated that the cutting tool 12 of this invention may be employed in any one of a variety of cutting machines. For instance, it may be used in vertical boring mills or jig boring machines, and various types of milling machines to name a few. Furthermore, the boring machine 10 may be either manual or automated with conventional computer numerical controls (CNC). In the machine depicted in FIG. 1, the cutting tool 12 is mounted horizontally and then inserted into a hole in a work piece to cut the hole to the requisite diameter.

As is conventional, when employing the cutting tool 12 of this invention a lubricating fluid may be utilized. After the work piece has been cut with the cutting tool 10, a variety of conventional manufacturing processes may be employed. For example, the surface of the work piece may be ground and polished.

In the embodiment depicted in FIGS. 1–3, the cutting tool 12 has a plurality of splines 14 with a plurality of teeth 16 disposed on each spline 14. In a most preferred embodiment, the tool 12 has four splines 14 with four teeth 16 disposed on each spline 14. Each spline 14 extends from the back of the cutting tool 12 to the front of the cutting tool 12. As is shown in FIGS. 1 and 2, the splines 14 are helically curved and do not extend parallel to a plane perpendicular to the longitudinal axis 28 of the cutting tool 12. For later reference, the longitudinal axis 28 of the cutting tool 12 has been labeled as the X axis and the transverse axes of the cutting tool 12 have been denoted as the Y and Z axes.

Each spline 14 has a cutting side 32 and a relief side 34. The cutting side 32 contacts the material to be cut as the cutting tool is rotated in the counter clockwise direction and is the surface upon which chips from the work piece impinge as the tool is rotated. Both the cutting side 32 and the relief side 34 are curved helically with respect to the longitudinal axis of the cutting tool. A helical shape is generally defined as a curve generated by a point moving about a cylindrical surface at a constant rate in the direction of the cylinder's axis. The shape of the cutting side 32 traverses such a helical pattern. Additionally, the relief side 34 also traverses a helical shape.

By curving the cutting side 32 and therefore the cutting face of the teeth 16, each tooth 16 forms angles that enhance the cutting process. One such angle is the radial rake angle RRA formed between the face of each tooth 16 and a plane PP perpendicular to the cutter's longitudinal axis, as denoted in FIG. 2. Since the face of each tooth 16 may be substantially curved, the radial rake angle RRA for a given point along the tooth face may be determined by drawing a tangent at that point and determining the angle between the plane PP and the tangent line. One such radial rake angle RRA is illustrated in FIG. 2. In accordance with conventional notation, the radial rake angle RRA for each tooth is positive because the cutting edge of the tooth leads the surface of each tooth face. This is significant because as chips are formed, a cutting surface with a positive radial rake angle directs the flow of chips away from the tool and the work piece. Moreover, the positive radial rake angle reduces the amount of force and torque needed to cut the work piece, as compared to a tool having teeth with either a radial rake angle of zero or a negative radial rake angle. Because of the helical shape of the teeth 16, the radial rake angle RRA increases as one moves from the inner portion of each cutting tooth to the outer portion of each cutting tooth. By varying the radial rake angle RRA in this manner, the advantages of a positive radial rake angle described above are accentuated.

As can be seen in FIGS. 1 and 2, because the cutting side 32 traverses a helical shaped pattern, the teeth 16 of the cutting tool also have a cutting face that is curved with respect to the axial direction of the tool, the X axis. Due to this curvature, each tooth 16 also forms an axial rake angle ARA shown in FIG. 1 between a line tangent to its cutting face in the axial direction and the plane PP perpendicular to the longitudinal axis of the cutting tool. As with the radial rake angles RRA, the axial rake angles ARA for each tooth are positive. Consequently, similar advantages, such as relatively lower forces and torques and continuous chip formation, are also achieved with the positive axial rake angles ARA. As is best shown in FIGS. 1 and 2, the axial rake angle ARA of any tooth closer to the front of the cutter is less than the axial rake angle ARA of any tooth further away from the front of the cutter. Alternatively stated, the axial rake angle ARA increases as a tooth's distance from the front of the tool increases. By varying the axial rake angle ARA in this manner, the advantages discussed above are even further enhanced.

Relief refers to the shape of the tool that provides relief for the cutting edge to keep the tool from rubbing on the cutting surface. When machining relatively hard materials, relief angles are typically minimized to provide support for the cutting tool. The cutting tool 12 has relief angles that are sufficient to keep the tool from rubbing on the cutting surface and to adequately support the tool. As is evident from FIGS. 1–3, the radial height of any tooth 16 along a spline 14 is less than the height of any tooth 16 disposed behind it and greater than any tooth 16 disposed forward of it. By way of example, one of the forward most teeth has a radial height denoted as $RH_1$ in FIG. 1 and the tooth adjacent to this tooth along the same spline 14 has a radial height $RH_2$, which is greater than $RH_1$. This provides relief for the teeth 16 in the axial direction and is denoted as AR in FIGS. 1 and 2. Furthermore, the top of each tooth 16 is sloped to provide relief in the radial direction. Relief in the radial direction is referred to as radial relief RR and is also depicted in FIG. 2. This sloping of the top of each tooth 16 prevents the top of each tooth 16 from rubbing on the surface of the material being cut and therefore, provides relief in the radial direction. Similarly, sloping the cutting face of each tooth in the axial direction prevents rubbing on the surface of the material being cut.

Thus, an improved cutting tool 12 has a plurality of splines 14 running from the back of the tool to the front of the tool in a helical shape. Because of the helical curvature of these splines 14, they create axial and radial rake angles that are both positive and enhance the cutting process. Furthermore, this helical curvature also creates both axial and radial relief angles that also enhance the cutting process.

Operation of the cutting tool 12 is depicted in FIG. 3. A portion of a material 36 to be machined into a rotor for a turbine is illustrated. The cutting tool is inserted into a pilot hole in the rotor and rotated to cut the material 36 to the desired diameter. It will be appreciated that since the teeth have a radial height that is successively larger from the front of the tool to the back of the tool, the tool creates a larger and larger diameter as it travels axially through the material 36.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

I claim:

1. A form cutting tool having a longitudinal axis for machining a work piece to form a turbine rotor, comprising:
   at least a first curved solid spline extending from a back of the tool to a front of the tool that has a curved face; and
   a first smaller and a second larger cutting tooth extending outward from the curved spline forming a unitary part of the spline and forming a continuous part of a cutting surface, each tooth having a top that is curved to provide radial relief RR for each tooth, and where the first tooth is disposed forward of the second tooth along the spline and has a radial height that is less than the radial height of the second tooth in order to provide axial relieve AR for each tooth.

2. The cutting tool of claim 1, further comprising a plurality of curved splines extending from the back of the cutting tool to the front of the cutting tool.

3. The cutting tool of claim 2, wherein each spline further comprises first and a second tooth extending outward from each curved spline, each tooth having cutting face that is curved in the radial direction and in the axial direction.

4. The cutting tool of claim 1, wherein the first and the second teeth are each curved in the axial direction to create a positive axial rake angle, the axial rake angle of the second tooth being greater than the axial rake angle of the first tooth.

5. The cutting tool of claim 1, wherein the first and the second teeth 20 are each curved in the radial direction to form a positive radial rake angle.

6. The cutting tool of claim 1, wherein the first curved spline has a helically shaped cutting surface.

7. A form cutting tool having a longitudinal axis for machining a work piece to form a turbine rotor, comprising:
   a plurality of curved solid splines extending from a back of the tool to a front of the tool and having a cutting surface that is helical in shape with respect to the longitudinal axis; and
   a plurality of cutting teeth disposed axially along each of the splines, each tooth extending outward from the curved spline and having a tooth face that forms a unitary part of the spline and a continuous part of the helically shaped cutting surface, wherein a top of each tooth is curved to provide radial relief RR for each tooth, each tooth is disposed forward of another tooth along a spline and has a radial height that is less than a radial height of the other tooth in order to provide axial relief AR for each tooth, and wherein the plurality of cutting teeth conform to the specific shape of the turbine rotor desired from a work piece.

8. The cutting tool of claim 7, wherein each tooth face is helically curved to form a positive radial rake angle.

9. The cutting tool of claim 7, wherein each tooth face is helically curved to form a positive radial rake angle.

10. A system for machining a work piece to form a turbine rotor of a specific shape, comprising:
    a cutting machining having a rotational means; and
    a form cutting tool adaptable to be rotated by the cutting machine to cut the work piece, comprising
    (i) a first curved solid spline extending from a back of the tool to a front of the tool so that it is not parallel to a plane perpendicular to a longitudinal axis of the tool, where the spline has a curved face and is curved in a helical shape with respect to the longitudinal axis; and
    (ii) a first smaller and a second larger cutting tooth extending outward from the curved spline, forming a unitary part of the spline and a continuous part of a cutting surface, each tooth having a top that is curved to provide radial relief RR for each tooth, and where the first tooth is disposed forward of the second tooth along the spline and has a radial height that is less than the radial height of the second tooth in order to provide axial relieve AR for each tooth.

11. The system of claim 10, wherein the cutting face of each tooth is curved in the axial direction to form an axial rake angle and the axial rake angle of any tooth disposed axially forward of another tooth is less than the axial rake angle of the other tooth.

12. The system of claim 10, wherein the cutting face of each tooth is curved in the radial direction to form a positive radial rake angle.

13. The system of claim 10, wherein the cutting face of each tooth is curved in the axial direction to form a positive axial rake angle.

* * * * *